United States Patent [19]

Kato et al.

[11] 4,330,925
[45] May 25, 1982

[54] METHOD AND APPARATUS FOR AUTOMATICALLY LOADING FLEXIBLE BELT-SHAPED RECORDING MEDIUM

[75] Inventors: Toshihiro Kato; Yuzo Tsunekawa, both of Odawara, Japan

[73] Assignee: Fuji Photo Film Co., Ltd., Kanagawa, Japan

[21] Appl. No.: 136,579

[22] Filed: Apr. 1, 1980

[30] Foreign Application Priority Data

Apr. 2, 1979 [JP] Japan .................................. 54/39500

[51] Int. Cl.³ .......................... B23Q 3/00; B23P 21/00
[52] U.S. Cl. ........................................ 29/464; 29/806; 29/169.5; 29/430
[58] Field of Search ............... 29/806, 464, 430, 169.5; 53/118

[56] References Cited
U.S. PATENT DOCUMENTS 3,518,746  7/1970  Hoover .............................. 53/118 X
4,035,899  7/1977  Matsuda ............................ 29/806 X
4,205,436  6/1980  Klotz et al. ....................... 29/806 X

*Primary Examiner*—Francis S. Husar
*Assistant Examiner*—Carl J. Arbes
*Attorney, Agent, or Firm*—Sughrue, Mion, Zinn, Macpeak and Seas

[57] ABSTRACT

A method and apparatus for loading a recording medium such as a video magnetic tape into a magazine or cartridge employing an S-shaped running path. Both surfaces of the recording medium are placed over winding cores and held in the S-shape by stationary and movable forming pins. The reels of the winding cores are held so as to shift the assembly to a position above a body part of the magazine on a pallet transported by a conveyor belt. The assembly is then lowered so that the guide members forming the S-shaped running path are inserted into hollow lower end portions of the forming pins. The forming pins are then lifted from the guide members as the reels are released.

9 Claims, 22 Drawing Figures

METHOD AND APPARATUS FOR AUTOMATICALLY LOADING FLEXIBLE BELT-SHAPED RECORDING MEDIUM

BACKGROUND OF THE INVENTION

The present invention relates to a method for automatically loading a flexible, belt-shaped recording medium into a container which is so designed that an ordinary person can readily record data on the recording medium and reproduce the data.

The term "flexible belt-shaped recording medium" as herein used is intended to mean a recording medium which is provided in a relatively compact container such as a magazine, cartridge or cassette which is manufactured by assembling plastic-molded members. The recording medium is in the form of a coil. While being unwound, the recording medium runs at a constant speed along a running path defined by guide members provided in the container while simultaneously signals such as video signals, audio signals, or data signals are recorded on the recording medium or signals previously recorded on the recording medium are reproduced.

Typically, the recording medium is 3 to 51 mm in width, 45 to 3000 m in length, and 6 to 50 $\mu$m in thickness. The recording medium is manufactured by forming a photosensitive film layer, a magnetic film layer or the like on the surface of a flexible supporting material. The supporting material may for example be made of a plastic film of polyethylenterephthalate, polyethylene-2, 6-naphthalate, cellulose diacetate, cellulose triacetate, cellulose acetate butyrate, cellulose acetate propionate, polyvinyl chloride, polyvinylidene chloride, polycarbonate, polyimide or polyamide; paper; paper coated with or laminated with $\alpha$-polyolefins 2 to 10 in the number of carbons such as polyethylene, polypropylene and ethylene copolymer; or metal foil of aluminum, copper or tin. Typical examples of the recording medium described above are "8 mm movie films", "audio tapes", "video tapes" and "data tape".

Heretofore, a simple running system has been employed for the recording medium running path formed by the guide members in the container in order to reduce the size of the container and to make it simple to place the recording medium over the guide members. The aforementioned "simple running system" has been employed for a film F in a single 8 mm movie film magazine 1 as shown in FIG. 1 such as manufactured by Fuji Photograph Film Co. or for a tape T in a compact audio tape cassette 21 as shown in FIG. 2 such as proposed by Phillips Co. In this running system, the guide members 2 and 3 guide the film F or the tape T in a predetermined direction while supporting only one surface, normally the rear surface, of the film F or the tape T.

This simple running system makes it relatively easy to load the film or the tape in the magazine or cassette. However, such a simple running system nonetheless has a number of problems. Recently, improvements in the quality of the film F or the tape T have been strongly demanded. In addition, video tapes or 8 mm movie films with magnetic stripes have been developed and used commercially. However, it is rather difficult for this simple running system to completely satisfy all the requirements accompanying the desired improvements.

Accordingly, various studies have been made to improve the running system of the recording medium in the container as a result of which novel magazines and cassettes have been proposed in the art. The proposed magazines and cassettes utilize a running system including a so-called "S-shaped running path" in which both surfaces of the recording medium are guided and supported by guide members. Such a running system including the S-shaped running path has been increasingly applied to other devices as well.

An example of a container employing a running system including an S-shaped running path in a home video system cassette is shown in FIGS. 3 through 7. The video tape cassette 30 has a body part or lower half 31. In the lower half 31, tape T is continuously supplied from a tape supplying hub 32 to a tape winding hub 38. While being held by a first guide pin 33 and the free end portion of an elastic piece 34, the direction of the tape T thus supplied is changed by 90° with the aid of a second guide pin 35. Thereafter, while both surfaces of the tape T are supported and guided by a third guide pin 36 and a first guide roller 37 at a relatively large winding angle, the running direction of the tape T is again changed by 90° to direct the tape T toward the tape winding hub 38.

In this case, a first S-shaped running path is formed by the guide pins 33 and 35 and the elastic piece 34 and a second S-shaped running path is formed by the third guide pin 36 and the first guide roller 37. The first S-shaped running path is effective in controlling the rate of supply of the tape from the tape supplying hub 32 and in regulating the displacement of the tape. The second S-shaped running path provides back-tension to the tape T as it is wound on the tape winding hub 38.

With the employment of the tape running system described above, the running characteristics of the recording medium are remarkably improved and the recording and reproducing characteristics and the quality of reproduced pictures are also considerably improved. However, the employment of this running system is still disadvantageous in the following points. First, the recording medium must be manually loaded in the container. Accordingly, the work efficiency in manufacture is extremely low and the production cost of the container is necessarily high when compared with a container using the above-described simple running system.

SUMMARY OF THE INVENTION

Accordingly, an object of the present invention is to provide a method for loading a recording medium into a container with high efficiency and an apparatus for practicing the method in which all of the above-described drawbacks accompanying the loading of a recording medium in a magazine, cartridge or cassette employing the above-described running system including the S-shaped path are eliminated.

The foregoing object and other objects of the invention have been achieved by the provision of a method for automatically loading a flexible belt-shaped recording medium in which an assembly of the flexible belt-shaped recording medium and a pair of winding cores is automatically loaded into a container having an S-shaped running path and an apparatus for practicing the method in which, according to the invention, while both surfaces of the recording medium laid over the winding cores are held in the form of the character "S" by stationary and movable forming pins, the reels of the winding cores are held so as to shift the assembly so that the assembly is positioned above the body part of the container. Next the assembly is lowered so that guide members forming the S-shaped running path of the body are inserted into the hollow lower end portions of the forming pins. The forming pins are then lifted from the guide members while the reels are being released whereby the assembly is automatically loaded at a predetermined position including the S-shaped running path in the body part of the container.

DESCRIPTION OF THE PREFERRED EMBODIMENTS

The method and apparatus according to the invention will be described with reference to the accompanying drawings.

A preferred embodiment of the invention described hereinafter relates to a method for loading a recording medium (hereinafter referred to as "a tape") in a container (hereinafter referred to as "a cassette") employed in a home video system of a type which has recently been developed and put to commercial use and a magnetic picture recording and reproducing system called as "a β system" or "a VHS system" and to an apparatus for practicing the method.

Figure 8:
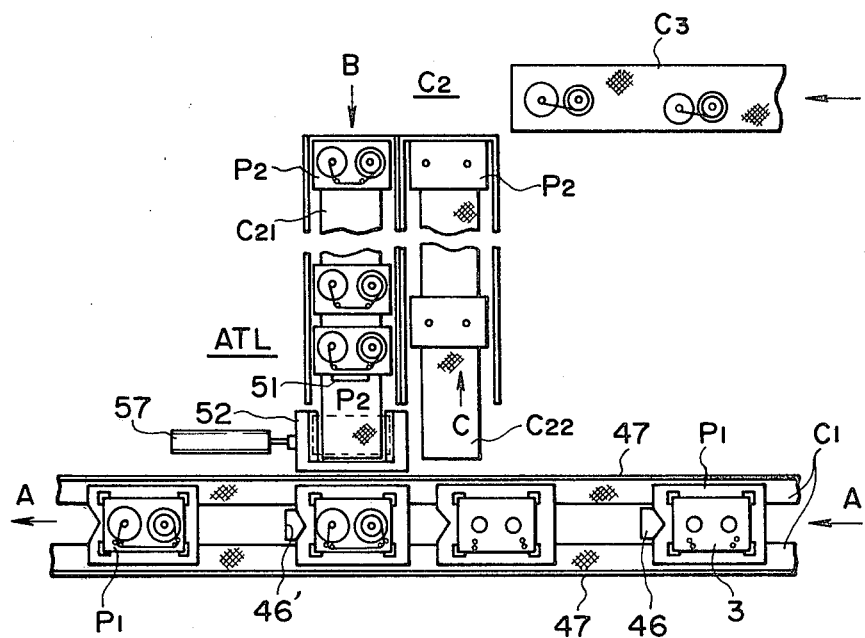
FIG. 8 is an explanatory diagram illustrating steps in an automatic tape loading process according to the invention.

FIG. 8 is a diagram illustrating steps in an automatic tape loading (ATL) process according to the invention and some of the steps which are conducted before and after the automatic tape loading process hereinafter referred to as "the initial process" and "the final process", respectively, when applicable.

In the initial process, various internal components, excluding a pair of hubs 32 and 38 with flanges and a tape T, are manually or automatically mounted on the body part of a cassette 30 which is made up of the upper and lower halves. The lower halves 31 enter at the right-hand side of FIG. 8. The initial process may be one of a number of available types and employ various assembly devices. In FIG. 8, a first conveyor $C_1$ is formed by two endless belts which move in a direction indicated by the arrow A at a constant speed. A number of first pallets $P_1$ are loaded on the first conveyor one after another. Each of the pallets is designed to hold the lower half 3 in place on the upper surface of the conveyor. Member loading stations (not shown) are arranged along the first conveyor $C_1$. When the pallets $P_1$ arrive at each member loading station, a stop 46 is disposed between the two endless belts in synchronization with the operation of the station to temporarily stop the movement in the direction A of the pallet $P_1$.

When the movement of a pallet $P_1$ is temporarily stopped, the pallet $P_1$ is positioned at the station with at least two sides of the pallet in abutment against the stop 46 and guide plates 47 which are provided along the outer edges of the two endless belts.

While the first pallet $P_1$ is stopped, the first conveyor $C_1$ is continuously driven. Therefore, it is desirable that the contact surfaces of the first pallet $P_1$ and the endless belts be made of a material which has a high wear resistance and low frictional coefficient. However, this requirement may be omitted if the stop 46 is designed so that it not only abuts against the front end of the first pallet $P_1$ to stop its movement but also supports the bottom of the first pallet $P_1$ to lift the pallet from the upper surfaces of the endless belts.

If a protrusion and a cut are formed in the abutment surfaces of the first pallet $P_1$ and the stop 46, respectively, in such a manner that the protrusion and the cut are provided with engagement surfaces which are inclined complementarily, then the first pallet $P_1$ can be positioned with a higher accuracy.

Figure 1:
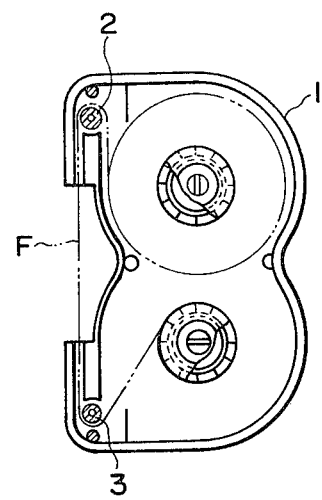
FIG. 1 and FIG. 2 are plan views showing running systems in conventional recording medium containers.
Figure 2:
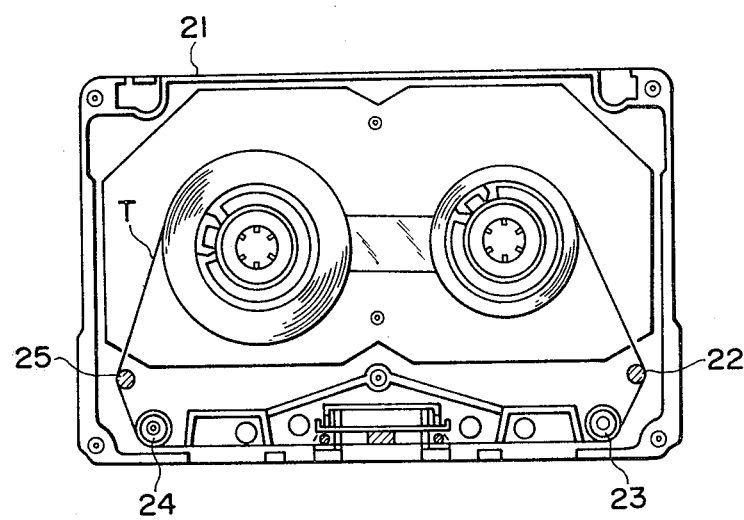
Figure 3:
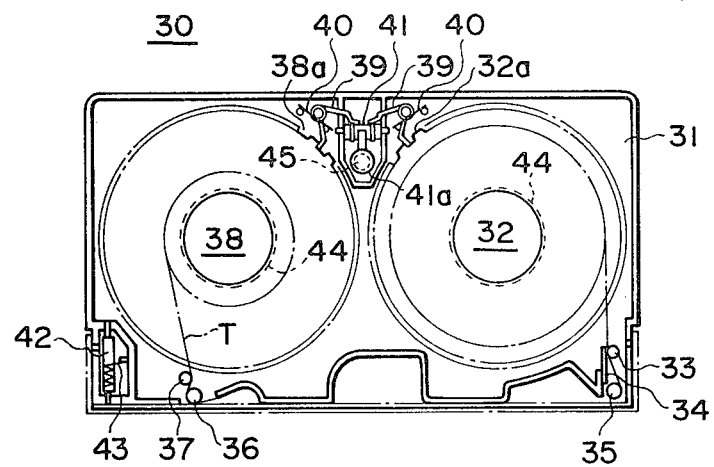
FIGS. 3 through 7 are explanatory diagrams illustrating the internal construction of a home video system cassette.
Figure 4:
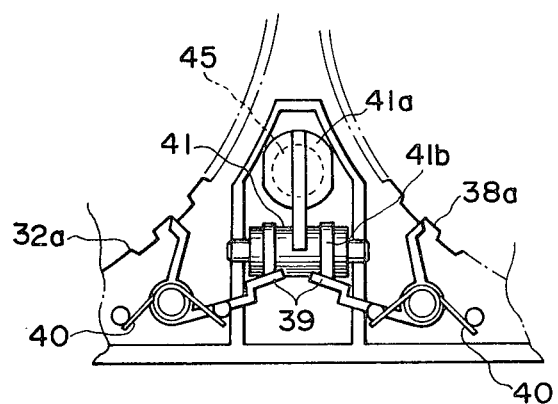
Figure 5:
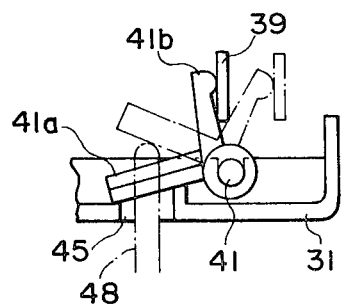
Figure 6:
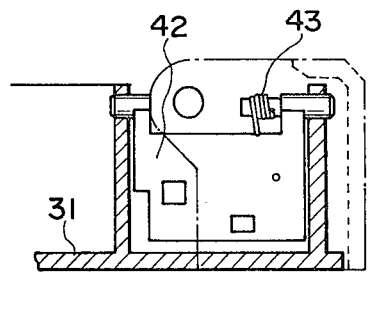
Figure 7:
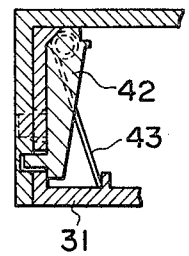

The members mounted in the lower half 31 in the initial process are, for instance, a first guide pin 33, an elastic piece 34, a second guide pin 35, a third guide pin 36, a first guide roller 37, a pair of brake levers 39, a pair of brake springs 40, a brake rotary shaft 41, a rotational cover lock plate 42 and a rotational cover lock spring 43, all of which are shown in FIG. 3. Moreover, a pair of hub holes 44 having a relatively large diameter and a small hole 45 through which is disposed a protrusion 41a of the brake rotatry shaft 41 are formed in the bottom of the lower half 31. The lower end portions of the pair of hubs 32 and 38 are inserted into the two hub holes 44 and the end portion 48 of a brake releasing means is inserted into the small hole 45 from outside as seen in FIG. 5. The lower halves 31 on which the above-described necessary members have been mounted in the initial process are successively delivered to the automatic tape loading (ATL) process station together with the pallets $P_1$ by the conveyor $C_1$.

The operations in the automatic tape loading process are substantially as follows:

(a) A tape T wound on a pair of hubs 32 and 38 in the tape winding process is placed on second pallets $P_2$ manually.

(b) The second pallets $P_2$ loaded with the tapes T are automatically supplied to the first conveyor $C_1$.

(c) Before the assembly of the hubs 32 and 38 and the tape T is transferred from the second pallet $P_2$ to the first pallet $P_1$ on the first conveyor $C_1$ on which the lower half has been placed, the tape path on the second pallet $P_2$ is automatically changed to be substantially similar to the ordinary tape path in the lower half 31. Hereinafter, this changing operation will be referred to as "forming" when applicable.

(d) The assembly of the two hubs 32 and 38 and the tape T is automatically transferred onto the lower half on the first pallet $P_1$ from the second pallet $P_2$.

(e) The second pallet $P_2$ from which the assembly has been removed is automatically returned.

(f) The lower half 31 on the first pallet $P_1$ on which the assembly of the hubs 32 and 38 and the tape T has been mounted is automatically conveyed to the following process station.

Figure 14:
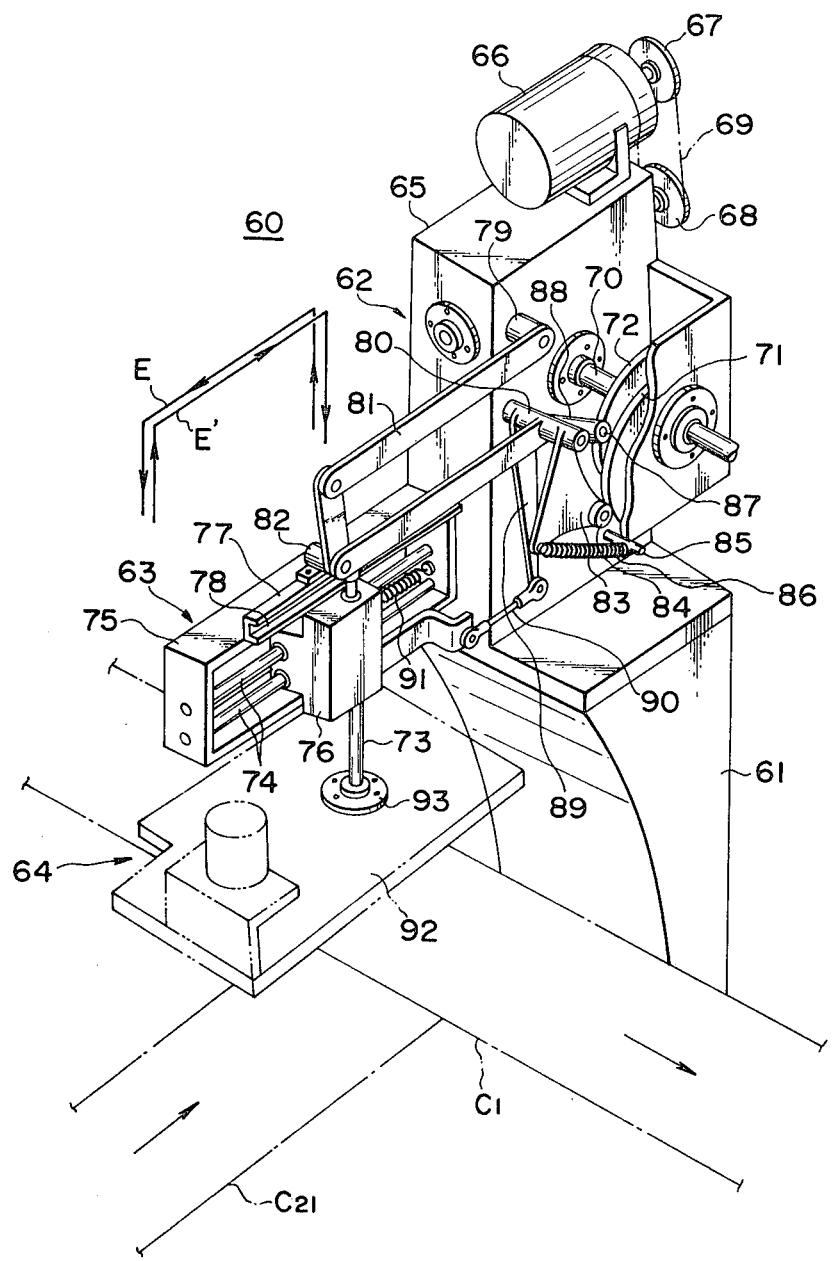
FIG. 14 is a perspective view showing the overall arrangement of an automatic tape loading unit of the invention.

The arrangement of an apparatus for practicing the automatic tape loading process of the invention will be described. The apparatus includes:

(1) the above-described first conveyor $C_1$;

(2) a second conveyor $C_2$ having a tape supplying conveyor $C_{21}$ and a return conveyor $C_{22}$;

(3) a tape forming and transferring device 60 shown in FIG. 14 which is provided in the vicinity of the intersection of the first conveyor $C_1$ and the tape supplying conveyor $C_{21}$; and (4) a third conveyor $C_3$ for conveying the tapes T wound on the hubs 32 and 38 to the second conveyor $C_2$.

The operations and effects of these elements forming the apparatus will be described.

(1) First Conveyor $C_1$

The operation of the first conveyor $C_1$ is as described before with respect to the initial process of the automatic tape loading process and therefore its detailed description will be omitted here. However, it should be noted that a stop 46 and guide plates 47 similar to those in the initial process are provided in the same manner to provide an automatic tape loading position at the intersection of the first conveyor $C_1$ and the second conveyor $C_2$.

(2) Third conveyor $C_3$

The third conveyor $C_3$ has an endless belt which is arranged parallel to the first conveyor $C_1$ and is spaced a relatively long distance from the first conveyor $C_1$. The unloading end of the third conveyor is close to the loading end of the second conveyor $C_2$.

Each tape is wound on each pair of hubs 32 and 38 in the tape winding process (not shown) to provide a hub and tape assembly as described before. The hub and tape assemblies thus provided are successively loaded onto the third conveyor $C_3$ and conveyed toward the second conveyor $C_2$. Whenever each hub and tape assembly reaches the unloading end of the third conveyor $C_3$, it is manually moved from the third conveyor $C_3$ to a working bench (not shown) by the operator.

(3) Second Conveyor $C_2$

As described before, the second conveyor $C_2$ includes a tape supplying conveyor $C_{21}$ and a return conveyor $C_{22}$. The two conveyors $C_{21}$ and $C_{22}$ are arranged in such a manner that they are parallel to each other and orthogonal to the first conveyor $C_1$. The tape supplying conveyor $C_{21}$ and the return conveyor $C_{22}$ are endless belts similar to the first conveyor $C_1$. The width of each of the endless belts is slightly shorter than the long side of the second pallet $P_2$.

Figure 9:
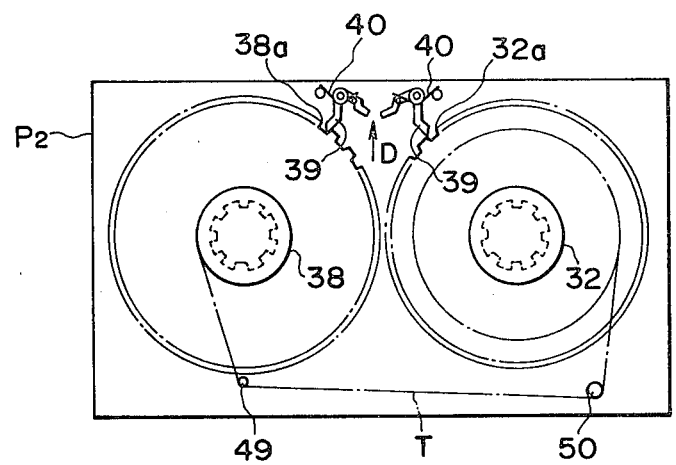
FIGS. 9 through 12 are also explanatory diagrams for a description of the forming operation effected for a second pallet according to the invention.

As shown in FIG. 9, a pair of rotary shafts (not shown), two stationary pins 49 and 50, a pair of brake levers 39, and a pair of brake springs 40 are provided on the upper surface of the second pallet $P_2$. The hub and tape assembly removed from the third conveyor $C_3$ by the operator is assembled with the second pallet $P_2$ by the operator. The pair of rotary shafts are adapted to rotatably support the above-described hubs 32 and 38 in such a manner that the distance between the hubs is substantially equal to that between the hubs in the lower half 31.

The two stationary pins 49 and 50 shown in FIG. 9 are embedded in the surface of the second pallet $P_2$ in such a manner that the positional relationship of the pins substantially corresponds to the positional relationship of the second guide pin 35 and the first guide roller 37 in the lower half 31 with respect to the hubs 32 and 38 mounted on the pair of rotary shafts and the pins 49 and 50 are positioned somewhat inwardly of the second guide pin 35 and the first guide roller 37. In addition, the two stationary pins 49 and 50 are positioned so that they are provided somewhat inwardly of the tape running path in the lower half 31 to form a running path supporting the rear surface of the tape T.

The positions of the two brake levers 39 and the two brake springs 40 correspond substantially to the positions of the brake levers and the brake springs which are mounted on the lower half 31, respectively. The end portions of the brake levers 39 are engaged with gears 32a and 38a which are formed in the circumferential portions of the flanges of the hubs 32 and 38 thereby to stop the rotation of the hubs 32 and 38.

While depressing the inner ends of the brake levers 39 against the elastic forces of the brake spring 40, the operator mounts the hubs 32 and 38 on the rotary shafts. Then, the operator pulls out a portion of the tape T wound on the hubs 32 and 38 and lays the portion of the tape T over the two stationary pins 49 and 50. Thereafter, the brake levers 39 are restored and one of the hubs 32 and 38 is turned manually to remove the slack in the tape T. At this point, the tape T is held under tension as shown in FIG. 9. Thereafter, the operator places the second pallet $P_2$ onto the tape supplying conveyor $C_{21}$ in such a manner that the long side of the second pallet $P_2$ is orthogonal to the endless belt, that is, the hubs 32 and 38 are disposed transversely to the endless belt.

The tape supplying conveyor $C_{21}$ is continuously driven to convey the second pallets $P_2$ in the direction of the arrow B. That is, the second pallets $P_2$ are conveyed towards the first conveyor $C_1$ one after another. The unloading end of the tape supplying conveyor $C_{21}$ is surrounded by a U-shaped receiver 52. The U-shaped receiver 52 functions as means for stopping, holding and positioning each second pallet $P_2$ on the tape supplying conveyor $C_{21}$.

Figure 13:
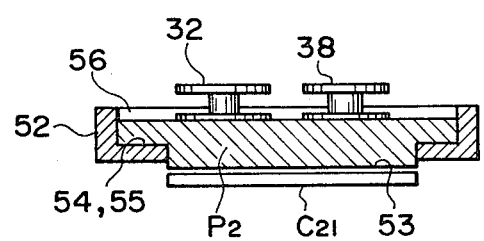
FIG. 13 is a side view of the second pallet.

The cooperative construction of the second pallet $P_2$ and the receiver 52 will be described in more detail. FIG. 13 is a sectional view showing the combination of the second pallet $P_2$ and the receiver 52. As is clear from FIG. 13, the bottom surface of the second pallet $P_2$ includes a surface 53 which is brought into contact with the endless belt $C_{21}$ and a surface 54 which remains out of contact with the endless belt $C_{21}$. Specifically, the surface 54 is in the form of a step.

The forward movement of the tape supplying conveyor $C_{21}$ is transmitted through the contact surface 53 to the second pallet $P_2$. Therefore, even if the non-contacting surface 54 is brought into contact with the fork surface 55 of the receiver 52, the forward movement of the second pallet will still continue. When the front, long side of the second pallet $P_2$ abuts against the stop surface 56 of the receiver 52, the movement of the second pallet $P_2$ is stopped and the positions of the three sides of the second pallet $P_2$ are regulated by the fork surface 55 and the stop surface 56. At this point, the second pallet is properly positioned. Before the second pallet $P_2$ reaches the receiver 52, the forward movement of the second pallet is temporarily stopped by a stop 51 which can freely move vertically in association with the above-described stop 46 provided along the first conveyor $C_1$.

When the hub and tape assembly is transferred from the second pallet $P_2$, which has been held by the receiver 52 and positioned onto the lower half 31 on the first conveyor $C_1$, the receiver 52 is shifted to the loading end of the return conveyor $C_{22}$ running along the tape supplying conveyor $C_{21}$ by the operation of an actuator 57 to thereby transfer the empty second pallet $P_2$ onto the return conveyor $C_{22}$ whose construction and operation is substantially the same as that of the tape supplying conveyor $C_{21}$ except the drive direction C is opposite to that of the tape supplying conveyor $C_{21}$. Immediately after the transfer of the empty second pallet $P_2$, the receiver 52 returns to the unloading end of the tape supplying conveyor $C_{21}$.

(4) Tape Forming and Transferring Device 60

FIG. 14 is a perspective view showing the entire arrangement of the tape forming and transferring device 60 hereinafter referred to as "a loading unit 60" when applicable. The loading unit 60 includes a self-standing type stand 61, a drive section 62, a transfer section 63, and a forming section 64. The stand 61 is fixedly provided on the floor on one side of the first conveyor $C_1$ on the side opposite to the side where the tape supplying conveyor $C_{21}$ is disposed. the transfer section 63 extends over the first conveyor $C_1$ from the front surface of the drive section 62 and protrudes thereover in such a manner as to overhang the receiver 52 provided at the unloading end of the tape supplying conveyor $C_{21}$. The forming section 64 is hung from the transfer section 63 in such a manner that it can move horizontally and vertically.

The structures of the drive section 62, the transfer section 63 and the forming section 64 will be described in more detail.

(4-1) Drive Section 62

In the drive section 62, reduction gear means (not shown) such as a worm-type reduction gear is housed in a box-shaped casing 65 on which an electric motor for driving the transfer section 63 is mounted. The rotation of the motor 66 is transmitted through chain sprockets 67 and 68 and a chain 69 to the reduction gear means to rotate the output shaft 70 thereof which extends parallel to the first conveyor $C_1$ and, accordingly, a vertical movement cam 71 and a horizontal movement cam 72 which are mounted on the output shaft 70 are rotated.

(4-2) Transfer Section 63

The transfer section 63 operates to move vertically and horizontally a main shaft 73 which extends vertically into a slider 76 which is movable in a horizontal direction which is parallel to the transverse direction of the first conveyor $C_1$. The slider 76 is slidably supported by two parallel guide bars 74 and 74. Both ends of each guide bar 74 are supported by an elongated frame 75 which extends over the first conveyor $C_1$ from the first surface of the casing 65 protruding above the receiver 52.

The main shaft 73 which extends vertically through the slider 76 has a head disposed in a guide groove 78 provided on one side of an elongated supporting bar 77 extends in the same direction as the guide bars 74. The length of the supporting bar 77 is equal to or slightly longer than that of the guide bars 74. A supporting shaft 82 is mounted at the central part of the upper surface of the supporting bar 77. The supporting shaft 82 is adapted to rotatably support one of the couplings of a parallel link mechanism 81 which is swingably supported by two supporting shafts 79 and 80 which protrude forwardly of the output shaft 70 from one side of the casing 65 and are positioned above and below the output shaft 70, respectively.

An end portion of the parallel link mechanism 81 which is supported by the supporting shaft 80 positioned below the output shaft 70 and which protrudes from the side wall of the casing 65 is rigidly coupled to a lever 85 which is also swingably supported by the shaft 80. Therefore, the rotation of the above-described vertical movement cam 71 is transmitted through a follower 84 to the lever 83 and the main shaft 73 is moved vertically by the parallel link mechanism 81 via the supporting shaft 82 and the supporting bar 77.

The follower 84 is energized by a coil spring 86 so that it is in contact with the cam surface of the cam 71 at all times. The spring 86 is connected between the lever 83 and a pin 85 on the side wall of the casing 65. A follower 87 abutting against the horizontal movement cam 72 is mounted on a lever 88. A lever 89 is coupled through a connecting rod 90 to a part of the slider 76. The levers 88 and 89 are arranged in the form of the letter "L" and are fixedly secured to the supporting shaft 80 and are swingably supported by the supporting shaft 80. Therefore, as the cam 72 rotates, the above-described slider 76 is moved horizontally along the guide bars 74 and 74 by the follower 87, the levers 88 and 89 and the connecting rod 90.

A coil spring 91 is connected between the slider 76 and a part in the casing 65 so that the follower 87 is in contact with the cam surface of the cam 72 at all times. If the cams 71 and 72 are combined by suitably setting the eccentric positions and amounts of eccentricity thereof, the main shaft 73 will be moved as indicated by the arrows E and E'.

(4-3) Forming Section 64

The entire forming section 64 is coupled to the lower end of the main shaft 73. The forming section 64 thus operates to move the first conveyor $C_1$ and the receiver 52 upwardly along the locus of the main shaft 73.

Figure 15:
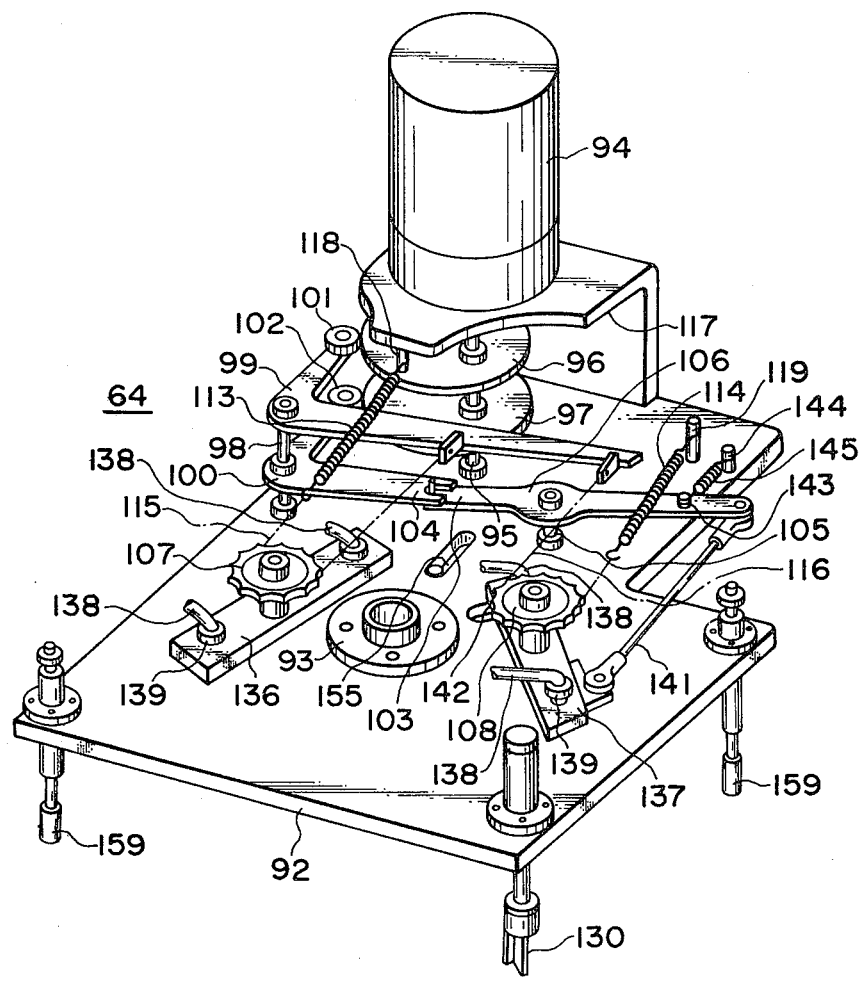
FIG. 15 is a perspective view showing a forming section in the apparatus shown in FIG. 14.
Figure 16:
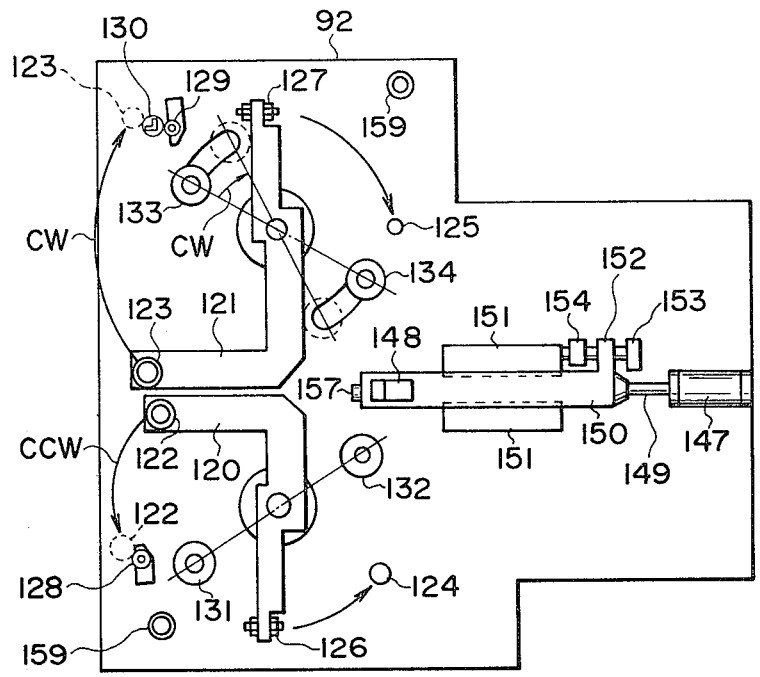
FIG. 16 is a bottom view of the forming section.
Figure 17:
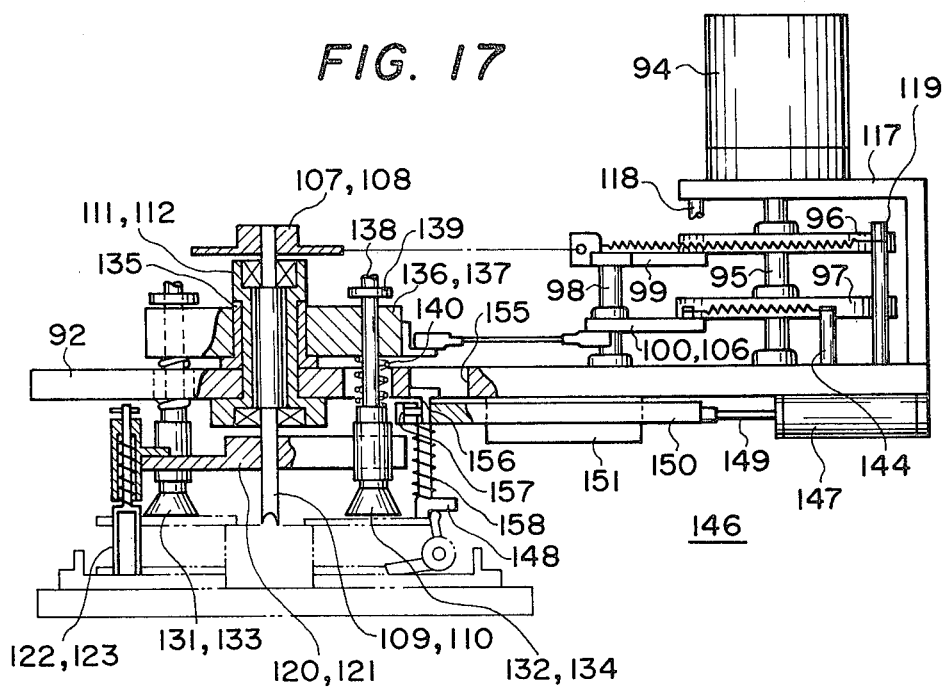
FIG. 17 is a side view of the tape loading unit of FIG. 14.

FIG. 15 is a perspective diagram showing the forming section 64 as viewed from above. FIG. 17 is a side view showing the essential components of the forming section 64. FIG. 16 is a bottom view of the forming section 64. In the forming section 64, the lower end of the main shaft 73 is connected to a flange 93 provided substantially at the central part of a flat substrate 93. An electric motor 94 is provided on the upper surface of the substrate 92 at a position close to the tape supplying conveyor $C_{21}$. Two cams 96 and 97 are mounted on the output shaft 95 of the motor which extends vertically.

L-shaped levers 99 and 100 are swingably supported by a common supporting shaft 98 mounted on the upper surface of the substrate 92. Followers 101 and 102 are provided on first ends of the levers 99 and 100, respectively. The followers 101 and 102 are maintained in contact with the cam surfaces of the cams 96 and 97 by have lower end portions which protrude below the substrate 92. The lower end portions thereof are adapted to elastically depress the second pallet P$_2$ and the upper surface of the lower half 31 thereby to prevent any displacement of the second pallet P$_2$ and the lower half 31 which may occur during the forming and transferring operations later described. A boss 160 is fixedly secured to the substrate 92 and a portion of the auxiliary pusher 159 closer to the top and end of the auxiliary pusher 159 is loosely fitted by a spring 162 through the boss 160. A ring-shaped stop 161 is mounted on the top end portion of the auxiliary pusher 159 which protrudes above the substrate 92 so as to prevent the removal of the auxiliary pusher 159.

Figure 19:
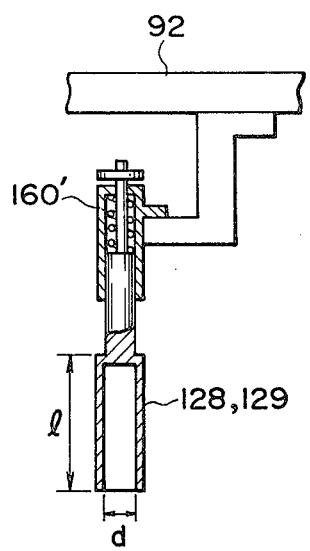
FIG. 19 is a sectional view of a stationary forming pin.

FIG. 19 is a sectional view of either of the above-described stationary forming pins 128 and 129. The arrangement of the stationary formings pins 128 and 129 is substantially similar to that of the above described auxiliary pusher 159 except that the boss 160' is fixedly secured to the substrate 92 in a different manner. The lower end portion of the stationary forming pins 128 and 129 is hollow. It is preferable that the length l of the hollow end portion be equal to or longer than the width of the tape T. It is necessary that the inside diameter d of the hollow end portion be sufficiently large that the first guide pin 33 and the first guide roller 37 can be disposed therein.

The arrangement of the movable forming pins 122 and 123 is similar to that of the stationary forming pins 128 and 129 except that the boss members are fixedly secured to the arms 120 and 121. The inside diameters of the lower end portions of the movable forming pins 122 and 123 are large enough to receive the second guide pins 35 and the third guide pin 36.

Figure 20:
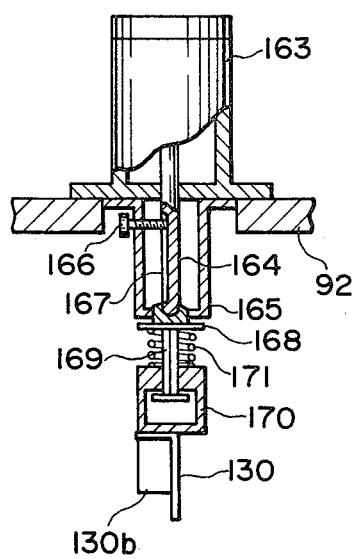
FIG. 20 is a sectional view of an elastic relieving pusher.

FIG. 20 is a sectional view of the above-described elastic piece relieving pusher 130. An actuator 163 is mounted vertically on the substrate 92. A rod 164 extends downwardly from the actuator 163 through the substrate 92. A cylindrical housing 165 is provided on the bottom of the actuator 163 and a screw 166 extends through the wall of the housing 165 and is threadably engaged therewith. The end of the screw 166 is engaged with a vertical groove cut in the rod 164 so as to prevent the rotation of the rod 164.

The lower end of the rod 164 is coupled to the upper end of a prism-shaped shaft 169 by an annular stop 168. As the stop 168 is designed to abut against the housing 165, the upward movement of the shaft 169 is limited. The lower end portion of the shaft 169 is fitted into a holder 170 provided on the pusher 130 in such a manner that the shaft 169 can be slightly moved up and down. A coil spring 171 is disposed around the shaft 169 between the stop 168 and the upper surface of the holder 170.

Next, the forming and transferring operation of the loading unit 60 will be described. As was described previously, when the second pallet P$_2$, which has received the hub and tape assembly with the tape T wound on the hubs 32 and 38 with the aid of the various members, is supplied into the receiving station provided at the unloading end of the tape supplying conveyor C$_{21}$ and is properly positioned, then the substrate 92 of the forming section 64 is moved along the locus (indicated by the arrow E in FIG. 14) and placed over the second pallet P$_2$ by operation of the transferring section 63.

Figure 10:
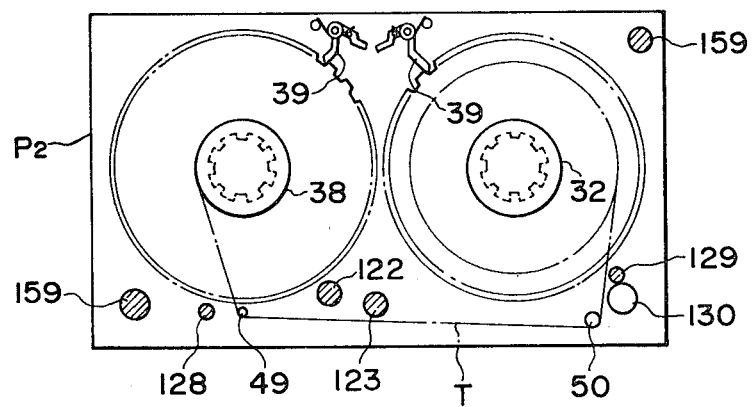

As the substrate 92 is moved downwardly, first the auxiliary pushers 159 elastically depress the upper surface of the second pallet P$_2$ to prevent any positional deviation of the second pallet P$_2$ while substantially simultaneously the stationary forming pins 128 and 129 and the movable forming pins 122 and 123, which have been held at their original positions, start approaching the respective forming start positions on the upper surface of the second pallet P$_2$ (FIG. 10).

The engaging member 148 of the brake releasing device 146 is moved downwardly while being maintained at its forward limit so as to elastically depress the inner ends of the brake levers 39. Thereafter, the engaging member 148 is shifted to its backward limit by the actuator 147 so as to push the inner ends of the brake levers 39 in the direction of the arrow D (FIG. 9) thereby disengaging the outer ends of the brake levers 39 from the reel gears 32a and 38a, that is, thereby releasing the braking functions of the hubs 32 and 38.

Following this, the electric motor 94 in the forming section 64 is started. As the electric motor 94 rotates, first the lever 99 with the follower 101 abutting against the cam surface of the cam 96 is swung so that the movable forming pins 122 and 123 whose lower ends have come sufficiently near the upper surface of the second pallet P$_2$ are turned from the original points toward the final positions.

Figure 11:
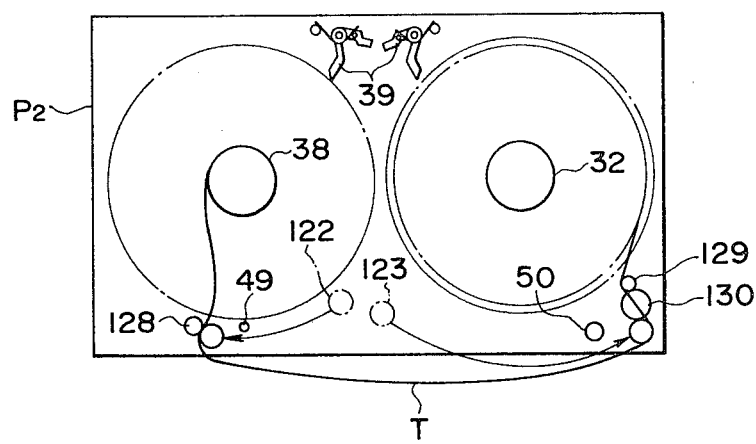
Figure 12:
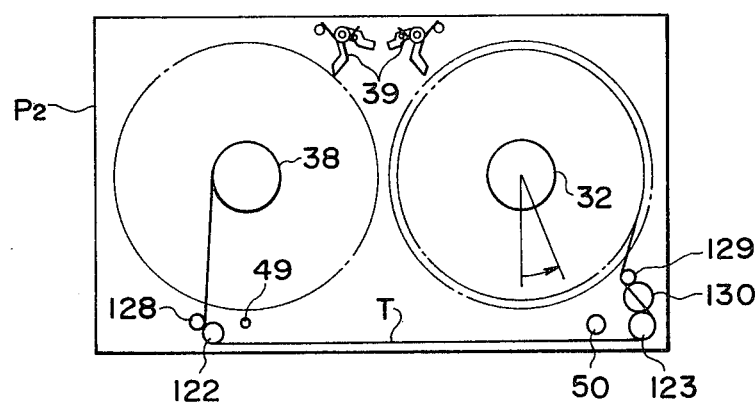

As the movable forming pins 122 and 123 are turned, the pins 122 and 123 come into abutment with the rear side of the tape T which has been laid over the stationary pins 49 and 50 as a result of which a part of the tape is pulled out of the tape supplying hub 32 from which the brake has been released as shown in FIG. 11 and, simultaneously, the front side of the tape is brought into contact with the stationary forming pins 128 and 129 by the movable forming pins 122 and 123 which started elastically depressing the upper surface of the second pallet P$_2$ slightly before the movable forming pins 122 and 123. Thus, a part of the tape T is bent and held in the form of the letter "S" by the pairs of stationary and movable forming pins 122 and 128, and 123 and 129.

The tape T on the second pallet P$_2$ is placed in a loading state similar to that in the running system including the S-shaped path in the lower half 31 by the above-described operation of the pairs of stationary and movable forming pins 122 and 128, and 213 and 129. The loading operation is referred to as "forming", as described before.

When the substrate 92 is further moved downwardly, then the suction pads 131 through 134 whose ends are slightly above the stationary and movable forming pins lightly and elastically depress the reels of the hubs 32 and 38. Thereafter, the suction pads 131 through 134 are connected through the pipes 138 to a vacuum source (not shown) so as to attach them to the upper surfaces of the reels.

Under this condition, the transfer section 63 is moved along the locus indicated by the arrow E as shown in FIG. 14. As a result, the substrate 92 is lifted from the second pallet P$_2$ while simultaneously the hubs 32 and 38 are released from the rotary shafts of the second pallet P$_2$ by the suction pads 131 through 134. At the same time, the stationary and movable forming pins are also lifted while holding the tape T in the form of the letter "S" while the engaging member 148 of the brake releasing means 146 is returned to its starting point and is disengaged from the brake levers 39.

As the lever 100 with the follower 102 and the bar 106 coupled to the lever 100 are swung by rotation of the cam 97 in the forming section 64, the suction pads the elastic forces of coil springs 113, 114 and 115, respectively.

A bar 106 is rotatably supported by a supporting shaft 105 on the upper surface of the substrate 92. A U-shaped slot 103 is formed in the second end of the lever 100. The U-shaped slot 103 is engaged with a pin 105 mounted on a first end of the bar 106 so that the swinging motion of the lever 100 is transmitted to the bar 106.

A rotary shaft 109 with a chain sprocket and a rotary shaft 110 with a chain sprocket are mounted through bearing members 111 and 112 on both sides of the flange 93 on the substrate 92. The distance between the rotary shafts 109 and 110 is equal to the distance between the hubs 32 and 38 on the second pallet $P_2$ and to the distance between the hub holes 44 and 44 in the lower half 31.

Chains 115 and 116 are laid over the chain sprockets 107 and 108, respectively, with one end of each of the chains 115 and 116 connected to the lever 99 and the other ends are connected respectively to coil springs 113 and 114. Therefore, rotational force is transmitted from the lever 99 which is swung by the rotation of the cam 96 to the rotary shafts 109 and 110. It is to be noted that the chains 115 and 116 are laid over the sprockets so that the direction of rotation of the rotary shaft 109 is opposite to that of the rotary shaft 110.

The other end of the coil spring 113 is connected to a pin 118 rigidly connected to a supporting bracket 117 on which the electric motor 117 is mounted. The other end of the coil spring 114 is connected to a pin 119 which is rigidly coupled to the substrate 92 at a position close to the bracket 117.

L-shaped arms 120 and 121 are provided symmetrical with each other in the vicinity of the lower end portions, which extend downwardly through the substrate 92, of the rotary shafts 109 and 110. Movable forming pins 122 and 123 are provided on adjacent end portions of the arms 120 and 121, respectively. Screws 126 and 127 are provided at the other ends of the arms 120 and 121, respectively. The screws 126 and 127 are placed so that they will abut against stops 124 and 125 connected to the lower surface of the substrate 92 which provide for fine adjustment of the amounts of swing of the arms 120 and 121, respectively.

As is clear from the above description, the movable forming pins 122 and 123 are moved in the directions of rotation of the rotary shafts 109 and 110 thereby describing arcuate loci around the rotary shafts 109 and 110. When the screws 126 and 127 are in abutment against the stops 124 and 125, respectively, the end points of movement of the movable forming pins 122 and 123, as indicated by the broken lines in FIG. 16, are accurately determined. In the vicinities of the end points of movement of the movable forming pins 122 and 123, stationary forming pins 128 and 129 extend downwardly from the lower surface of the substrate 92.

The end points of movement of the movable forming pins 122 and 123 and the positions of the stationary forming pins 128 and 129 correspond to the positions of the guide pins and guide rollers 33, 35, 36 and 37 in the lower half 31 positioned on the first conveyor $C_1$, respectively.

An elastic relieving pusher 130 is provided between the end point of movement of the movable forming pin 123 and the stationary forming pin 129 on the supplying hub 32 side and at a position corresponding to the position of the above-described elastic piece 34.

Two pairs of suction pads 131 and 132, and 133 and 134 are provided around the rotary shafts 109 and 110. More specifically, the suction pads 131 through 134 extend through the substrate 92 controlling the outer surfaces of the reels of the hubs 32 and 38 without obstructing the rotational operations of the arms 120 and 121 below the substrate 92.

Blocks 136 and 137 are fitted through sleeves 135 on the bearing members 111 and 112 which protrude above the substrate 92. Connecting tube members 138 penetrating through each block and annular stops 139 are mounted on the members 138. A coil spring 140 is provided for each connecting tube member 138. Therefore, both surfaces of each of the blocks 136 and 137 are held by the coil springs 140 and the annular stops 139. In this manner, an elastic suspension system is formed by holding the suction pads 131 through 134 and therefore the suction pads 131 through 134 can be brought into tight contact with the reels.

The block 137 closer to the supplying hub 32 is coupled through a connecting rod 141 to the other end of the bar 106. With this structure, as the cam 97 rotates, the block 137 is turned around the rotary shaft 110. In order to allow the block 137 to turn, an arcuate elongated slot 142 is formed in the substrate 92 through which extends the connecting tube member 138. A coil spring 145 is connected between a pin 143 rigidly coupled to the bar 106 near the other end of the bar 106 and a pin 144 rigidly coupled to the substrate 92 near the pin 119 so that the follower 102 is maintained in contact with the cam surface of the cam 97 by the elastic force of the spring 145.

A brake releasing device 146 is provided on the lower surface of the substrate 92. The brake releasing device 146 has an actuator 147 provided close to the electric motor on the lower surface of the substrate and an engaging member 148 provided above the second pallet $P_2$ in the receiver 52 and the brake levers 39 or the lever depressing pieces 41b of the rotary shaft 41 in the lower half 31 as positioned on the first conveyor $C_1$. The engaging member 148 is connected through a rod 149 and a sliding rod 150 to the actuator 147. The sliding rod 150 is held by guide rails 151 which are provided on both sides of the sliding rod 150 so as to guide the horizontal reciprocation in the widthwise direction of the first conveyor $C_1$.

A protrusion 152 is provided at the end of the sliding rod 150 which is closer to the actuator 147 and stops 153 and 154 are provided on both sides of the protrusion 152 wherein the protrusion 152 can abut against either of the stops 153 and 154 thereby to regulate the horizontal reciprocation of the engaging member 148. An elongated hole 155 is cut in a portion of the substrate 92 corresponding to the region through which the engaging member 148 reciprocates so as to allow the head of the engaging member 148 to move vertically.

The end portion of a screw 157 which penetrates the end face of the sliding rod 150 is inserted into a groove 156 cut into the neck of the engaging member 148. This prevents rotational vibration around the axis of the neck of the engaging member 148. Furthermore, an elastic suspension system is employed in which the end portion of the sliding rod 150 is held from above and below by the head and the coil spring 158 so that the engaging member 148 is held in tight engagement with the brake member.

Figure 18:
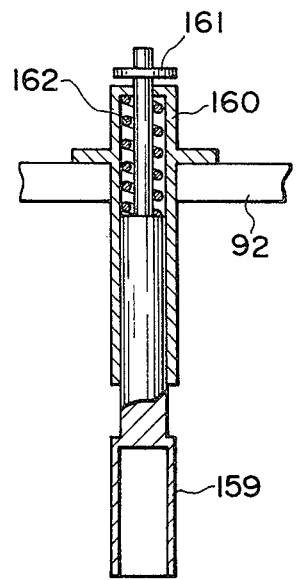
FIG. 18 is a sectional view of an auxiliary pusher.

FIG. 18 is a sectional view of an auxiliary pusher 159 mounted on the substrate 92. The auxiliary pushers 159

Figure 21:
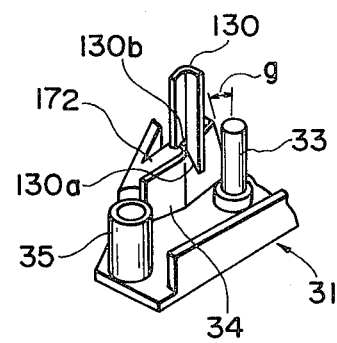
FIG. 21 is an explanatory diagram for a description of the operation of the pusher shown in FIG. 20.

133 and 134 corresponding to the supplying hub 32 are turned slightly in the direction of the arrow CW (FIG. 16) from the standby or original position. As a result, a part of the tape T is laid over the supplying hub 32 and the tape T loaded in the form of the letter "S" between the stationary and movable forming pins is placed under tension whereby the tape is placed in a loading state substantially following the tape path in the lower half The substrate 92 holding the tape T thus placed under tension and the hubs 32 and 38 on its lower surface is lowered from its position above the receiver 52 toward the lower half 31 held by the first pallet $P_1$ which has been maintained in a stationary position on the first conveyor $C_1$ as the substrate 92 is moved along the locus indicated by the arrow E in FIG. 14. As the substrate 92 is lowered toward the lower half 31, first the auxiliary pushers 159 elastically depress the inner surfaces of the corner parts of the lower half 31 to prevent displacement of the lower half while simultaneously the elastic piece relieving pusher 130 is extended to its lowermost limit by operation of the actuator 163. As a result, the lower end portion of the pusher 130 deflects the region of the upper edge of the elastic piece 34 disposed between the first and second guide pins 33 and 35 inwardly of the lower half 31 by use of the sloped edge 130a of the pusher 130 so that the region of the free end of the elastic piece 34 depressing the first guide pin 33 is separated from the first guide pin 33 to provide a gap g into which the tape T can be inserted as shown in FIG. 21. The pusher 130 has a horizontal stepped edge 130b which extends substantially at right angles from the sloped edge 130a. Therefore, depression of the elastic piece 34 by the sloped edge 130a is stopped when the stepped edge 130b is elastically in abutment with the upper edge surface of the mounting seat 172 of the elastic piece 34 by means of the coil spring 171.

Next, the brake releasing device 146 is operated to swing the lever depressing pieces 41b of the rotary shaft 41 which are elastically depressed by the engaging member 148 thereby preventing the outer ends of the brake levers 39 from coming into contact with the circumferential walls of the reels of the hubs 32 and 38.

While the region of the free end of the elastic piece 34 is maintained separated from the first guide pin 33 by the pusher 130 as described above, the first through third guide pins 33, 35 and 36 and the first guide roller 37 are inserted into the hollow lower end portions of the stationary and movable forming pins, respectively. The suction pads 131 through 134 causes the lower end portions of the hub 32 and 38 to be inserted into the two hub holes 44 formed in the bottom of the lower half 31.

Thereafter, as the cam 97 is rotated, the suction pads 133 and 134 corresponding to the supplying hub '32 are returned to their original or standby position. That is, the suction on the reel's upper surface is released. The tape T on the supplying hub 32 is thus unwound slightly and the tension on the tape T is reduced somewhat. Following this, the transfer section 63 is operated to again move the substrate 92 along the locus indicated by the arrow E'. Therefore, the stationary and movable forming pins are removed from the first through third guide pins 33, 34 and 36 and the first guide roller 37 and are lifted leaving the tape T in the lower half 31.

Before the substrate 91 is lifted, the engaging member 148 of the brake releasing device 146 is returned to its original position as a result of which the hubs 32 and 38 are braked so as to prevent the tape T from being excessively slackened.

Figure 22:
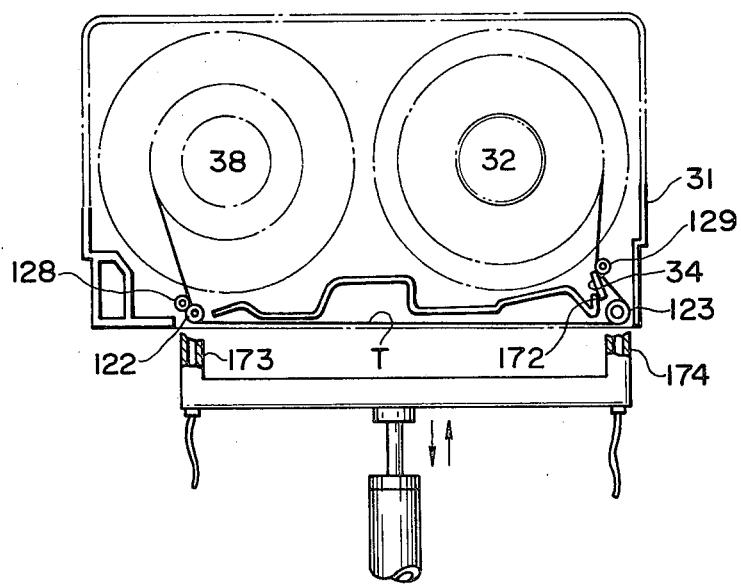
FIG. 22 is also an explanatory diagram for a description of the operation of tape suction pads provided below a self-standing type stand.

In lifting the substrate 92 as described above, a pair of tape suction pads 173 and 174 shown in FIG. 22 provided below the stand 61 attach to the front side of the tape T which is supported by the walls on the side of the stand 61 of the movable forming pins 122 and 123. Therefore, the tape T which is liable to move upwardly with the lifting of the stationary and movable forming pins can be more positively retained and loaded in the desired tape path in the lower half 31. Upon completion of the forming and transferring operations as described above, the lower half 31 in which the hub and tape assembly has been set in place together with the first pallet $P_1$ is automatically conveyed to the succeeding process station by the first conveyor $C_1$.

The forming and transferring operations are typically achieved in four or five seconds. Therefore, with the method and apparatus according to the invention, the work efficiency is greatly increased and the burden on the operator of the apparatus is considerably decreased in comparison with a conventional method and apparatus.

It is not always necessary that the third conveyor $C_3$ be arranged parallel to the first conveyor $C_1$. That is, even if the third conveyor is arranged forming an angle with the first conveyor and extending closer to the end of the second conveyor $C_2$, no problems will result thereby.

The second pallets $P_2$ can be automatically supplied to the tape supplying conveyor $C_{21}$ also in accordance with the following method. A receiver 52 similar to that provided at the unloading end of the tape supplying conveyor $C_{21}$ is provided at the loading end of the return conveyor $C_{22}$. The operator places the hub and tape assembly on the emptied second pallet $P_2$ delivered to the receiver 52 following which the receiver 52 is shifted to the loading end of the tape supplying conveyor $C_{21}$.

In the above-described second pallet $P_2$, the brake levers 39 are provided for both of the hubs. However, the brake lever 39 may be provided only for the supplying hub 32. In this case, the number of brake levers can be reduced.

The suction pads 131 through 134 are provided for the reels of the hubs 32 and 38 in the above-described embodiment. However, other suitable holding means such as for instance swingable fingers may be employed instead of the suction pads. In this case, the fingers hold the peripheral portions of the reels so as to conduct the above-described transferring operation and release the tension of the tape through a turning operation.

Application of the pair of tape suction pads 173 and 174 may be omitted in the case when the tape can relatively readily leave the walls of the movable forming pins. This in turn depends on the amount of the released tension of the tape T the frictional coefficient of the rear side of the tape, the rigidity of the tape and the like.

While the invention has been described with reference to a method for automatically loading a recording medium such as for use in a magnetic tape cassette for a home video system and the apparatus for practicing the method, it is nonetheless believed obvious that the technical concept of the invention can be applied to other recording media and containers.

What is claimed is:

1. A method for automatically loading a flexible belt-shaped recording medium in which an assembly of said flexible belt-shaped recording medium including a pair of winding cores having winding reels is automatically loaded in a container having an S-shaped running path comprising the steps of:

holding both surfaces of said recording medium laid over said winding cores in the form of the character "S" by stationary forming pins and movable forming pins while simultaneously holding corresponding reels of said winding cores;

shifting said assembly and said stationary and movable forming pins so that said assembly is positioned above a body part of said container;

lowering said assembly and said stationary and movable forming pins so that guide members forming said S-shaped running path of said body part are inserted into hollow lower end portions of said stationary and movable forming pins; and lifting said stationary and movable forming pins from said guide members while releasing said reels whereby said assembly is automatically loaded at a predetermined position including said S-shaped running path in said body part of said container.

2. An apparatus for automatically loading a flexible, belt-shaped recording medium in a container having an S-shaped running path comprising:

(a) a pallet, a pair of supporting rods for supporting a pair of winding cores, stationary guide members for supporting said recording medium and brake means for said winding cores being provided on an upper surface of said pallet;

(b) forming means positioned above said pallet comprising a pair of stationary forming pins and a pair of movable forming pins adapted for holding both surfaces of said recording medium with the rear surface of said recording medium being supported by said stationary guide members on said pallet, means for releasing said brake means, and winding core holding means; and (c) transfer means for shifting said forming means to a body part of said container so that said forming means is positioned above said body part of said container.

3. An apparatus for automatically loading a flexible, belt-shaped recording medium in a container having an S-shaped running path comprising:

(a) a pallet, a pair of supporting rods for supporting a pair of winding cores, stationary guide members for supporting said recording medium and brake means for said winding cores being provided on an upper surface of said pallet;

(b) forming means positioned above said pallet comprising a pair of stationary forming pins and a pair of movable forming pins adapted for holding both surfaces of said recording medium with the rear surface of said recording medium being supported by said stationary guide members on said pallet, means for releasing said brake means, and winding core holding means;

(c) transfer means for shifting said forming means to a body part of said container so that said forming means is positioned above said body part of said container;

(d) said flexible, belt-shaped recording medium comprises a magnetic tape including a magentic layer on a flexible, non-magnetic supporting material;

(e) said forming means further comprises a pusher disposed above and between said stationary and movable forming pins for deflecting the free end of an elastic piece mounted in said S-shaped running path in said body part of said container away from said S-shaped running path; drive means for turning at least one of said winding core holding means around the axis of said winding core; and suction means for retaining the front surface of said magnetic tape which is supported by said movable forming pins arranged in the vicinity of said body part at a predetermined position, said movable forming pins being inserted into the hollow lower parts of said guide members forming said S-shaped running path in said body part.

4. The apparatus as claimed in claim 3 further comprising first conveyor belt means for conveying said pallets.

5. The apparatus as claimed in claim 4 further comprising second and third conveyor belt means arranged parallel to one another and perpendicular to said first conveyor belt means.

6. The apparatus as claimed in claim 3 wherein said transfer means comprises a main shaft coupled to said forming means, said main shaft extending vertically; a slider movable in a horizontal direction parallel to the transverse direction of said first conveyor, said main shaft extending vertically through said slider; first and second parallel guide bars, said slider being slidably supported by said two parallel guide bars; an elongated frame extending over said first conveyor and supporting both ends of each of said guide bars; an elongated supporting bar having a guide groove therein extending in the same direction as said guide bars, said slider having a head portion disposed in said guide groove; and a supporting shaft and parallel link mechanism coupled to said head portion of said slider to move said head portion along said guide groove.

7. The apparatus as claimed in claim 6 further comprising drive means operatively coupled to said parallel link mechanism, said drive means including an electric motor; reduction gear means coupled to an output shaft of said motor; a vertical movement cam and a horizontal movement cam mounted on an output shaft of said reduction gear means; and cam follower means coupled to said parallel link mechanism and operatively engaged with said cams for moving said parallel link mechanism.

8. The apparatus as claimed in claim 3 wherein said transfer means further comprises elastic suspension means for supporting said suction means.

9. The apparatus as claimed in claim 3 wherein said drive means of said forming means comprises a second electric motor; first and second cams mounted on an output shaft of said motor, said output shaft of said motor extending vertically; first and second L-shaped levers swingably supported by a common supporting shaft; cam followers mounted on an end of each of said L-shaped levers in engagement with respective cam surfaces of said first and second cams mounted on said output shaft of said electric motors; and spring means coupled to each of said L-shaped levers for holding said L-shaped levers in contact with said cams.

* * * * *